United States Patent [19]

Wilson et al.

[11] Patent Number: 4,684,496
[45] Date of Patent: Aug. 4, 1987

[54] DEBRIS TRAP FOR A PRESSURIZED WATER NUCLEAR REACTOR

[75] Inventors: John F. Wilson, Murrysville Boro; Robert F. Barry, Monroeville Boro, both of Pa.

[73] Assignee: Westinghouse Electric Corp., Pittsburgh, Pa.

[21] Appl. No.: 672,040

[22] Filed: Nov. 16, 1984

[51] Int. Cl.$^4$ .................. G21C 3/30; G21C 19/30; G21C 15/00
[52] U.S. Cl. .................... 376/352; 376/313; 376/439; 376/446; 210/521
[58] Field of Search ........... 376/352, 313, 439, 440, 376/443, 446, 364, 224, 225; 210/232, 519, 521, 320, 478, 305

[56] References Cited

U.S. PATENT DOCUMENTS

| | | |
|---|---|---|
| 979,481 | 12/1910 | Hannold . |
| 1,240,081 | 9/1917 | Moss .................... 210/521 |
| 1,504,233 | 8/1924 | Graham . |
| 3,379,619 | 4/1968 | Andrews et al. ............ 376/439 |
| 3,389,056 | 6/1968 | Frisch .................... 376/442 |
| 3,801,453 | 4/1974 | Jones .................... 376/440 |
| 3,933,584 | 1/1976 | Litt ...................... 376/439 |
| 4,036,690 | 7/1977 | Betts et al. . |
| 4,076,586 | 2/1978 | Bideau et al. ............ 376/352 |
| 4,089,741 | 5/1978 | Patterson et al. .......... 376/439 |
| 4,096,032 | 6/1978 | Mayers et al. . |
| 4,427,624 | 1/1984 | Marlatt et al. ............ 376/446 |

FOREIGN PATENT DOCUMENTS

| | | | |
|---|---|---|---|
| 0102493 | 8/1979 | Japan ...................... 376/443 |
| 4141989 | 11/1979 | Japan ...................... 376/352 |
| 28977 | 12/1906 | United Kingdom ............ 210/521 |
| 1478985 | 7/1977 | United Kingdom ............ 376/443 |
| 1597189 | 9/1981 | United Kingdom ............ 376/440 |
| 0784890 | 12/1980 | U.S.S.R. .................. 210/521 |

Primary Examiner—Harvey E. Behrend

[57] ABSTRACT

A debris trap is mounted within a bottom nozzle of a fuel assembly so as to capture and retain debris carried by coolant flowing from the lower core plate openings of the nuclear reactor to the fuel assembly. The trap includes a structure disposed below the adapter plate of the bottom nozzle and between the corner legs of the nozzle. The structure is composed of a plurality of straps aligned with one another in a crisscross arrangement and defining a plurality of interconnected wall portions which form a multiplicity of small cells each having open opposite ends and a central channel for coolant flow through the trap. A plurality of spring-like fingers are punched out of the wall portions and bent to extend into the cell channels toward the downstream end of the trap structure to provide means to capture and retain pieces of debris carried through the channels by flowing coolant. Outwardly projecting tabs are provided on the upstream end of the trap structure for holding large pieces of debris to prevent lateral circulation thereof along, and repeated impact thereof against the structure. Also, leaf springs are attached to opposite sides of the structure and engagable with a pair of the corner legs of the bottom nozzle for releasably locking the trap structure in place in the bottom nozzle.

14 Claims, 6 Drawing Figures

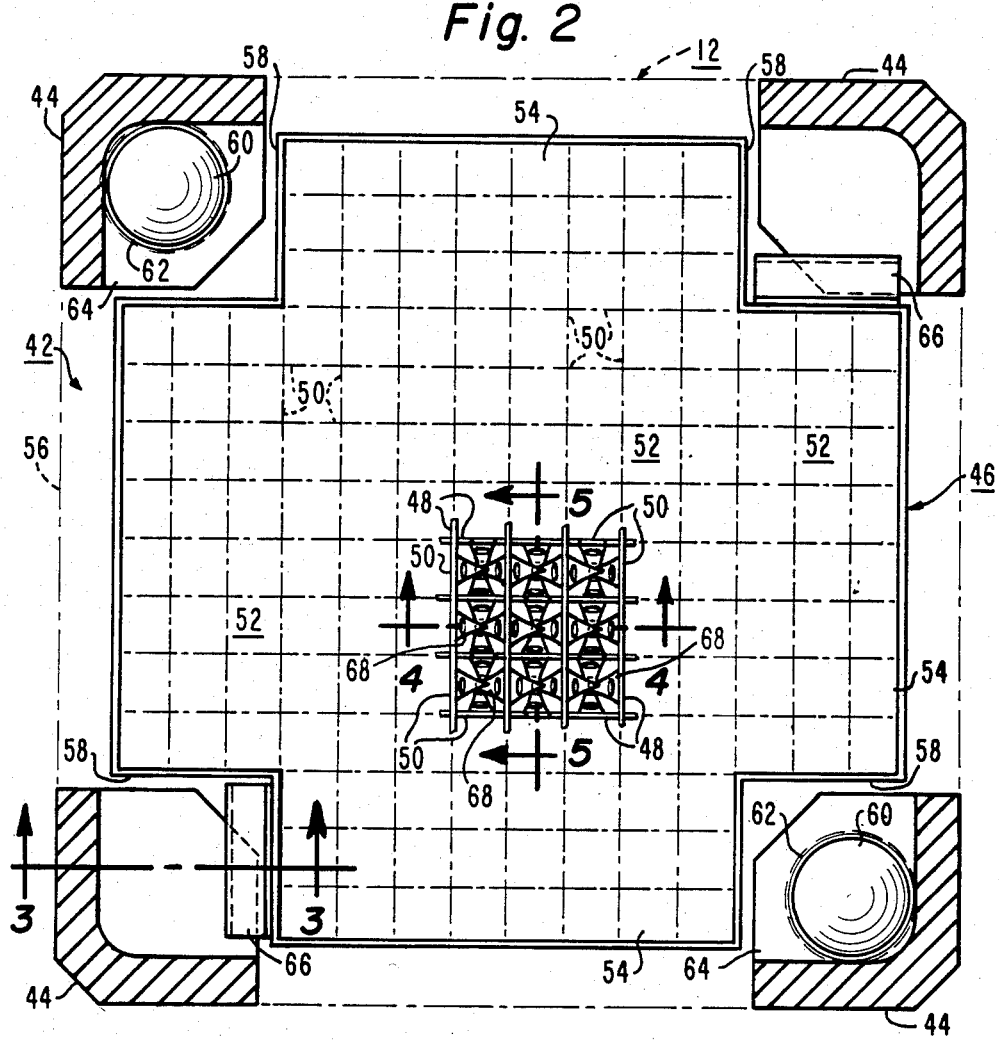
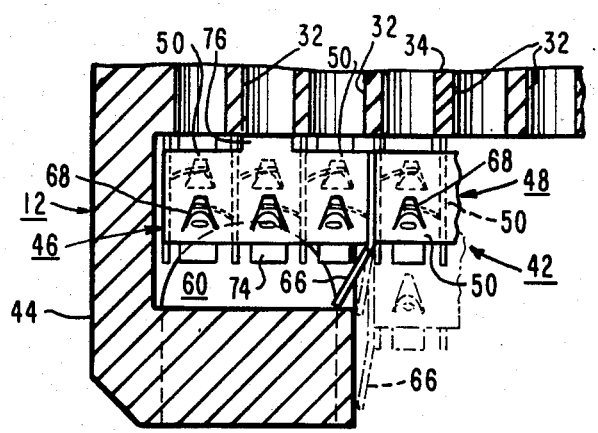
Fig. 2
Fig. 3

DEBRIS TRAP FOR A PRESSURIZED WATER NUCLEAR REACTOR

CROSS REFERENCE TO RELATED APPLICATION

Reference is hereby made to the following co-pending U.S. patent applications dealing with subject matter related to the present invention:

1. "Fuel Assembly Bottom Nozzle with Integral Debris Trap" by John F. Wilson, U.S. Ser. No. 672,041, filed Nov. 16, 1984.

2. "Wire Mesh Debris Trap for a Fuel Assembly" by William Bryan, U.S. Ser. No. 675,511, filed Dec. 7, 1984.

BACKGROUND OF THE INVENTION

1. Field of the Invention

The present invention relates generally to nuclear reactors and, more particularly, is concerned with a trap mounted in the bottom nozzle of a fuel assembly for capturing and retaining debris left in the reactor after assembly, repair and/or replacement operations and thereby preventing entry and lodging thereof in the fuel assembly where the debris can cause cladding perforations in the fuel rods and other damage to the fuel assembly.

2. Description of the Prior Art

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the systems.

In particular, fuel assembly damage due to debris trapped at the bottom grid has been noted in several reactors in recent years. The damage consists of fuel rod tube perforations caused by fretting of debris in contact with the exterior of the tube. The debris tends to be relatively thin rectangular pieces, as opposed to pieces which are spherical in shape. Specifically, most of the debris consists of metal turnings which were probably left in the primary system after steam generator repair or replacement. The debris lodges in the region of the lowermost grid within the spaces between its "eggcrate" shaped cell walls and the lower end portions of the fuel rod tubes. Almost all of the debris is deposited just above the four coolant flow openings in the lower core support plate.

Several different approaches have been proposed and tried for carrying out removal of debris from nuclear reactors. Many of these approaches are discussed in U.S. Pat. No. 4,096,032 to Mayers et al. While all of the approaches described in this patent operate reasonably well and generally achieve their objectives under the range of operating conditions for which they were designed, a need still exists for a fresh approach to the problem of debris removal in nuclear reactors. The new approach must be compatiable with the existing structure and operation of the components of the reactor, be effective throughout the operating cycle of the reactor, and at least provide overall benefits which outweigh the costs it adds to the reactor.

SUMMARY OF THE INVENTION

The present invention provides a debris trap designed to satisfy the aforementioned needs. Underlying the present invention is the recognition of the mechanism by which debris is captured and retained in the bottom grid of the fuel assembly and application of that mechanism to the design of the trap structure. The entrapment mechanism by which small pieces of debris are trapped and retained by the lowermost grid centers around the interaction between the cell walls and compliant members (springs and dimples) of the grid and the fuel rod tube. The coolant flow seems to wedge the debris into the grid cell, and the compliance of the cell and debris holds it in place.

The trap of the present invention seeks to simulate this mechanism but at a different location. Specifically, the trap is mounted within the bottom nozzle where coolant flow first enters the fuel assembly and employs a multiplicity of small cells with means for providing a lateral force on the debris to retain it in the cells. Thus, whenever coolant flow stops, the debris will not fall back into the system only to impact the trap structure again upon restart of coolant flow. By being mounted within the bottom nozzle, the trap structure and debris captured therein are removed from the reactor system with the fuel assembly. Also, the trap is designed to be backfittable on existing fuel assemblies.

Accordingly, the present invention sets forth in a fuel assembly for a nuclear reactor including a plurality of nuclear fuel rods, at least one grid supporting the fuel rods in an organized array, an end nozzle disposed adjacent the grid and liquid coolant flowing through the end nozzle and into the fuel assembly, a trap for capturing and retaining debris carried by the flowing coolant to prevent entry of debris into the fuel assembly. The debris trap includes: (a) a structure disposed adjacent the end nozzle on an opposite side thereof from the grid, the structure forming a multiplicity of small cells each being open at opposite ends and defining a central channel for passage of coolant flow therethrough to the end nozzle; and (b) means defined in each of the cells for capturing and retaining within the structure any debris carried into the cells by the coolant flowing therethrough.

More particularly, the debris trap structure includes interconnected wall portions forming each of the cells and defining the central channel thereof, with the capturing and retaining means being in the form of a spring-like finger attached to one of the wall portions and extending into the channel of the cell and downstream toward the end nozzle. Specifically, the structure is composed of a plurality of straps aligned with respect to each other in a crisscross interlocking arrangement and defining the wall portions of each cell in oppositely-disposed interconnected pairs thereof. One spring-like finger is punched out of each wall portion of each pair thereof, and the fingers on one pair of wall portions are disposed in the cell downstream of and in overlapping relation with the fingers on the other pair of wall portions. The structure is sized to fit within the end nozzle and includes means in the form of a pair of leaf springs for releasably locking it within the end nozzle. A plurality of tabs are mounted on the upstream end of the structure and project outwardly therefrom for grasping and holding pieces of debris generally stationary so as to prevent lateral circulation thereof along, and repeated impact thereof against, the debris trap structure.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged top plan view of the debris trap as seen along line 2—2 of Fig. 1, illustrating the legs of the bottom nozzle of the fuel assembly, partly in sectional form, and only a few of the cells of the trap structure and the spring-like fingers disposed therein.

FIG. 3 is an enlarged fragmentary view, partly in section, of a leg of the bottom nozzle of the fuel assembly and a leaf spring on the debris trap structure engaged with the leg for releasably locking the trap within the bottom nozzle, as seen along line 3—3 of FIG. 2.

DETAILED DESCRIPTION OF THE INVENTION

Figure 1:
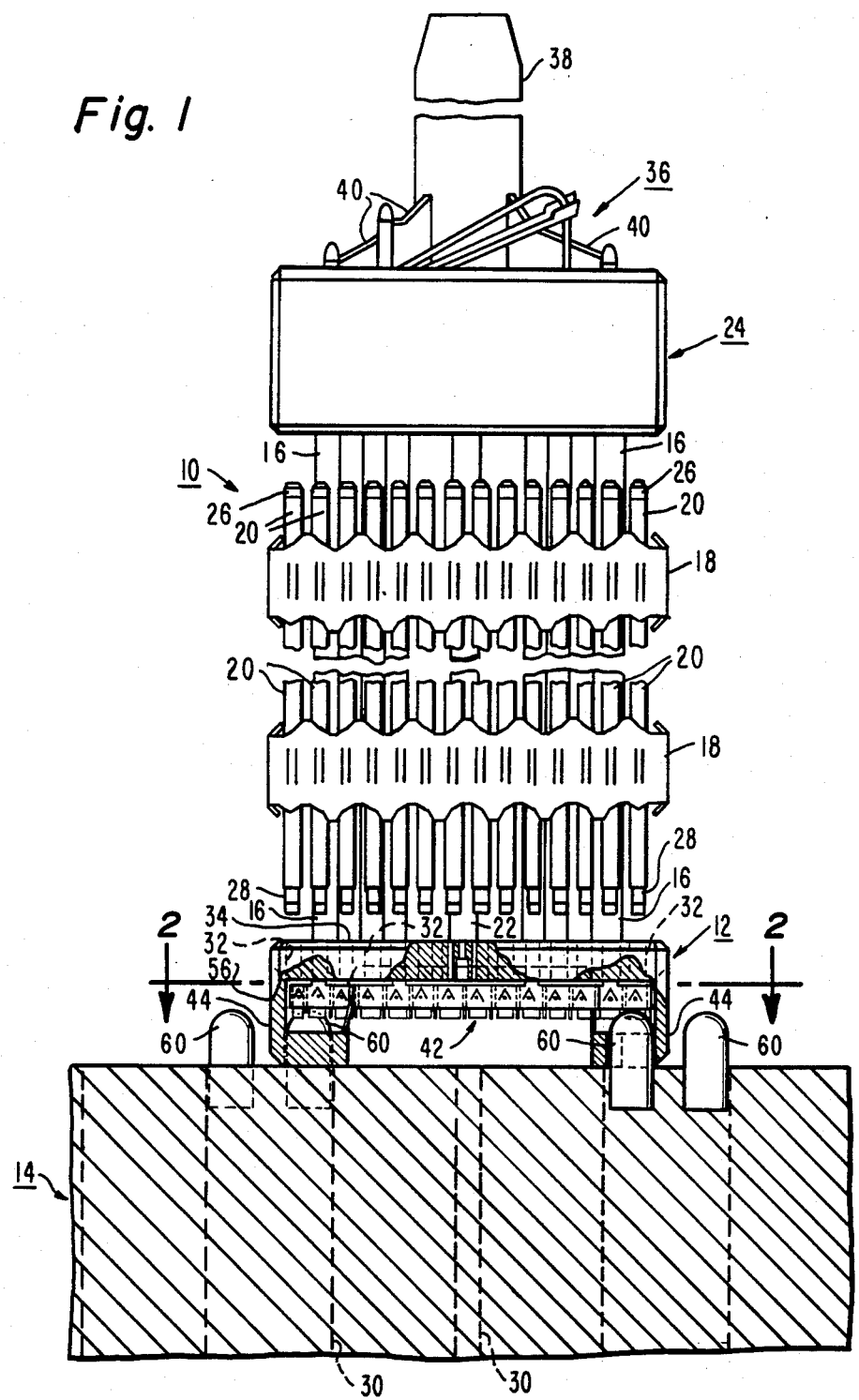
FIG. 1 is an elevational view, partly in section, of a fuel assembly which incorporates the debris trap of the present invention, the assembly being illustrated in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor and basically includes a lower end structure or bottom nozzle 12 for supporting the assembly on a lower core support plate 14 in the core region of a reactor (not shown), and a number of longitudinally extending guide tubes or thimbles 16 which project upwardly from the bottom nozzle 12. The assembly 10 further includes a plurality of transverse grids 18 axially spaced along the guide thimbles 16 and an organized array of elongated fuel rods 20 transversely spaced and supported by the grids 18. Also, the assembly 10 has an instrumentation tube 22 located in the center thereof and an upper end structure or top nozzle 24 attached to the upper ends of the guide thimbles 16. With such an arrangement of parts, the fuel assembly 10 forms an integral unit capable of being conveniently handled without damaging the assembly parts.

As mentioned above, the fuel rods 20 in the array thereof in the assembly 10 are held in spaced relationship with one another by the grids 18 spaced along the fuel assembly length. Each fuel rod 20 includes nuclear fuel pellets (not shown) and is closed at its opposite ends by upper and lower end plugs 26,28. The fuel pellets composed of fissile material are responsible for creating the reactive power of the reactor. A liquid moderator/coolant such as water, or water containing boron, is pumped upwardly through a plurality of flow openings 30 in the lower core plate 14 to the fuel assemblies. The bottom nozzle 12 of each assembly 10 has a series of flow holes 32 defined in its upper central adapter plate 34 through which the coolant flows upwardly through the guide thimbles 16 and along the fuel rods 20 of the fuel assembly in order to extract heat generated therein for the production of useful work.

To control the fission process, a number of control rods (not shown) are reciprocally movable in the guide thimbles 16 located at predetermined positions in the fuel assembly 10. Specifically, the top nozzle 24 includes a rod cluster control mechanism 36 having an internally threaded cylindrical member 38 with a plurality of radially extending flukes or arms 40. Each arm 40 is interconnected to a control rod such that the control mechanism 36 is operable to move the control rods vertically in the guide thimbles 16 to thereby control the fission process in the fuel assembly 10, all in a well-known manner.

Debris Trap Mounted in Bottom Nozzle

As mentioned above, fuel assembly damage due to debris trapped at the lowermost one of the grids 18 has been noticed in recent years. Therefore, to prevent occurrence of such damage, it is highly desirable to trap and remove this debris before it reaches the lowermost grid 18.

The present invention relates to a debris trap, generally indicated by the numeral 42, mounted inside or within the bottom nozzle 12 adjacent to and below its upper central adapter plate 34 and between its corner legs 44, as illustrated in FIG. 1. The trap 42 is positioned across the path of coolant flow from the lower core plate openings 30 to the adapter plate holes 32 so as to capture debris, such as small loose parts or pieces, from the flowing coolant and thereby prevent it from entering the fuel assembly 10. Instead, the debris is retained within the trap 42 which permits removal of the debris along with the trap 42 and fuel assembly 10 at the next refueling.

Turning now to FIG. 2, the debris trap 42 includes a structure 46 being composed of a plurality of straps 48 aligned with respect to each other in a cross-laced or crisscross interlocking arrangement. The straps 48 in such an arrangement define a plurality of interconnected wall portions 50 which form a multiplicity of cells, each being generally designated as 52, with any given interior one of the wall portions 50 being shared by two adjacent ones of the cells 52. Each four interconnected wall portions 50, which form a given one of the cells 52, define the cell 52 with open opposite ends and a central channel 54 extending generally parallel to the path of coolant flow for passage of coolant therethrough to the adapter plate 34 of the bottom nozzle 12. Preferably, each cell 52 has a length to width ratio that is less than one.

As seen in FIGS. 1 and 2, the debris trap structure 46 has cross-sectional dimensions sized to allow the structure to fit within the peripheral skirt 56 of the bottom nozzle 12 between the corner legs 44 thereof and extend generally coplanar with the adapter plate 34 of the nozzle. Notches 58 are defined in the corners of the structure 46. One diagonal pair of the notches 58 provide adequate space for a diagonal pair of alignment pins 60 which extend upright from the lower core plate 14 and fit through openings 62 formed through flanges 64 of one diagonal pair of the corner legs 44. The other diagonal pair of the notches 58 provide adequate space for means in the form of a pair of leaf springs 66 disposed in the notches and anchored on the trap structure 46 to engage the flanges 64 of the other diagonal pair of corner legs 44 for locking the structure 46 within the bottom nozzle 12 upon installation of the trap 42 therein.

The trap 42 is installed by lowering the fuel assembly 10 over the trap which has been positioned on a suitably raised fixture (not shown). The retaining or locking leaf springs 66 are deflected inwardly, as seen in FIG. 3, by the bottom flanges 64 of the diagonal pair of legs 44 of the bottom nozzle 12 as the fuel assembly 10 is lowered. The springs 66 then snap outwardly over the flanges 64 when the springs have cleared the top thereof. The trap 42 is then locked in place and can be moved with the fuel assembly 10. In operation, the coolant flow holds the trap 42 in contact with the underside of the adapter plate 34 of the bottom nozzle 12.

The debris trap 42 also includes means in the form of a plurality of spring-like fingers 68 defined in each of the cells 52 for capturing and retaining within the structure 46 any debris carried into the cells 52 by coolant flowing therethrough. Each wall portion 50 which is common to two adjacent cells 52 has at least two fingers 68 attached to it at two levels, one above the other. Each finger 68 is punched out of material of the strap 48 forming the wall portion 50 and bent so as to extend into the cell channel 54 and point downstream toward the bottom nozzle adapter plate 34. Specifically, with respect to the two fingers 68 punched out of any common wall portion 50, one finger 68 extends into one of the adjacent cells 52 sharing the common wall portion 50, while the other finger 68 extends into the other of the adjacent cells.

Figure 4:
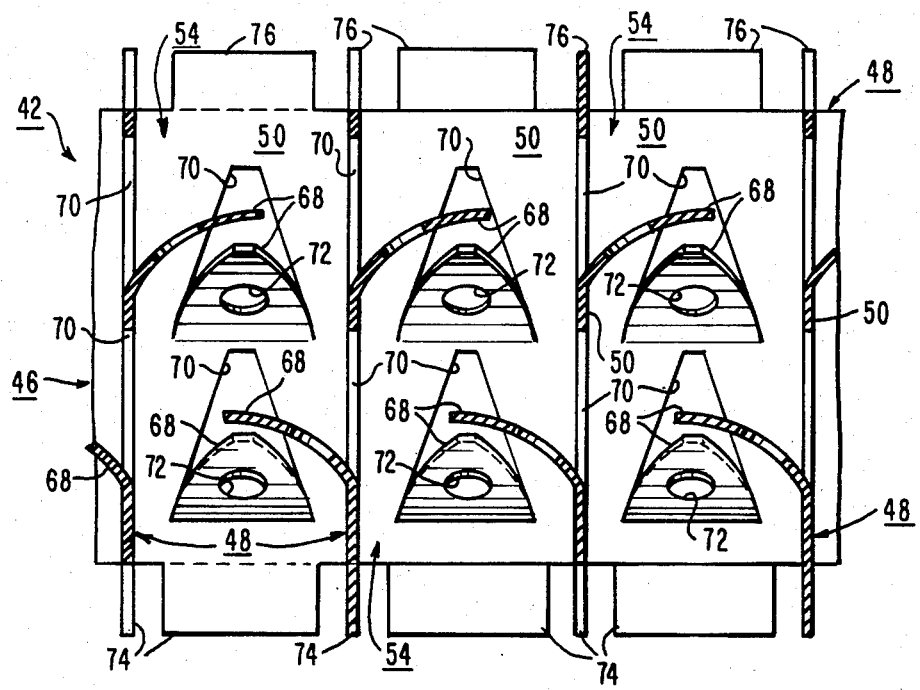
FIG. 4 is an enlarged fragmentary view of the debris trap structure, partly in section, as seen along line 4—4 of FIG. 2, showing one arrangement of the spring-like fingers projecting from the wall portions of the cells and into the channels defined through the cells by the wall portions.
Figure 5:
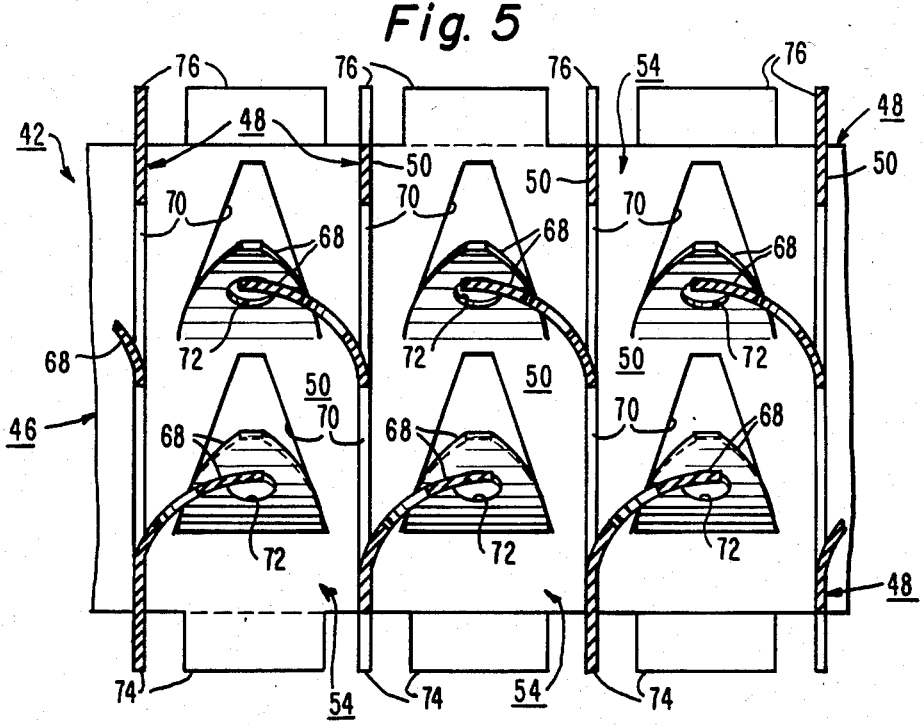
FIG. 5 is an enlarged fragmentary view of the debris trap structure, partly in section, as seen along line 5—5 of FIG. 2, showing the same arrangement of fingers as seen in FIG. 4 but from a viewing position located ninety degrees from that of FIG. 4.
Figure 6:
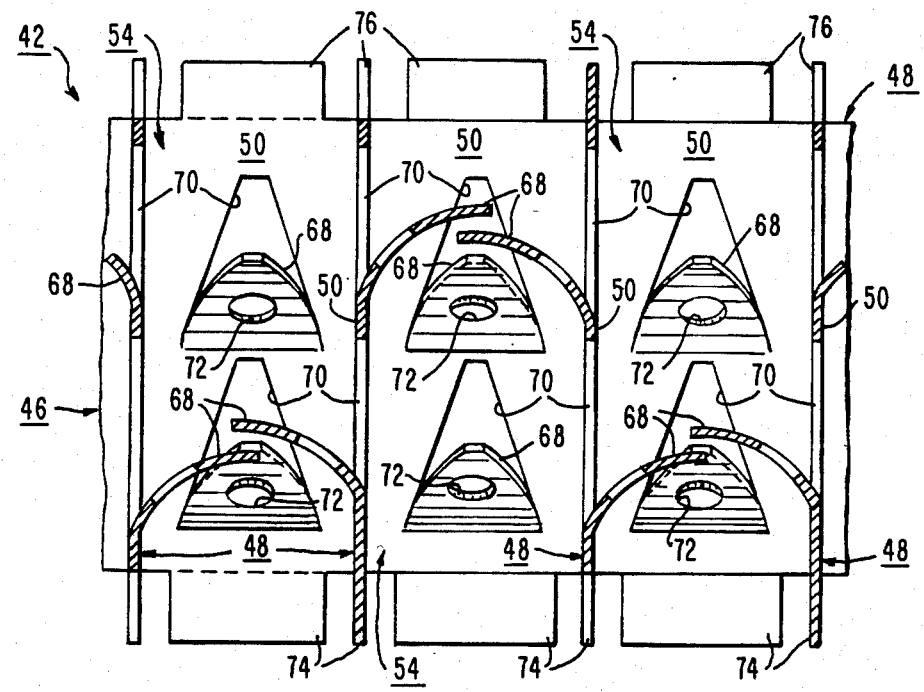
FIG. 6 is an enlarged fragmentary view of the debris trap structure, partly in section, similar to that of FIG. 4, but showing another arrangement of the spring-like fingers projecting from the wall portions of the cells and into the channels defined through the cells by the wall portions.

FIGS. 4, 5 and 6 show various combinations of arrangements of the fingers 68 in the respective cells 52. In one form of the finger arrangement shown in FIGS. 4 and 5, the fingers 68 on oppositely-facing wall portions 50 of a given cell 52 are disposed at two different levels. Thus, in this arrangement, the two fingers 68 at the same level are displaced ninety degrees from each other on wall portions 50 which are connected to one another. In another form of the finger arrangement shown in FIG. 6, the fingers 68 on oppositely-facing wall portions 50 of a given cell 52 are disposed at the same level. Thus, the two fingers 68 at the same level in this arrangement are displaced one hundred eighty degrees from each other. However, in both arrangements, the two fingers 68 at each level overlap at their respective tip ends one slightly above the other. Further, in both arrangements, the overlapped tips of the two fingers at the upper level, in turn, overlap the overlapped tips of the two fingers at the lower level in each cell 52. In such manner, the channel 54 through the cell 52 is obstructed by the fingers 68 and the overlapping and spaced apart relationship between the upper and lower sets of fingers 68 provides several regions in the cell channel 54 within which pieces of debris can be trapped and retained in the structure 46. The resilient or spring-like nature of each finger 68 gives it the capability of imposing a lateral force on a piece of debris so as to force it against the wall portion 50 and retain the debris in the trap 42.

Even though the fingers 68 obstruct the cell channel 54, they only minimally impede the flow of coolant through the trap 42. First, each wall portion 50 has an opening 70 formed therein at the region where the finger was punched out which facilitates cross flow of coolant through the wall portions 50 between individual ones of the cells 52. Also, each finger 68 has a hole 72 formed through it which allows increased flow of water through the cell.

Further, as seen in FIG. 1, and in greater detail in FIGS. 3—6, the underside or upstream end of the trap structure 46 has a plurality of lower tabs 74 which project outwardly toward the lower core plate 14, while the upperside or downstream end of the structure 46 has a plurality of upper projections 76 which extend outwardly toward the bottom nozzle adapter plate 34. The upper projections 76 ensure that there will be some space between the downstream end of the trap structure 46 and the underside of the adapter plate 34 to permit some cross flow of coolant between the trap 42 and the adapter plate.

The purpose of the lower tabs 74 is to grasp large pieces of debris to prevent them from moving horizontally along the bottom of the trap 42 to a point of reduced flow velocity, where they would fall back into the flow stream and impact the underside of the trap structure 46 again. These tabs 74, in conjunction with coolant flow, keep very large pieces of debris substantially stationary and in place on the underside of the trap, so they don't circulate around under the trap and repeatedly impact the trap. It is recognized that whenever coolant flow is stopped, most of the very large pieces of debris will fall back onto the lower core plate 14. However, large pieces of debris that land on the core plate can be seen when the fuel assembly 10 is removed, and then can be removed by remote means. Pieces that fall back through the core plate flow openings 30 may be circulated back into the bottom nozzle 12 on a future cycle, but again stand a high probability of being retained by the core plate since there is much more surface area than hole area in the core plate so these pieces eventually can be removed also. Meanwhile, they will not damage the fuel assemblies.

It is thought that the debris trap of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a fuel assembly for a nuclear reactor including a plurality of nuclear fuel rods, at least one grid supporting said fuel rods in an organized array, an end nozzle with a transverse adapter plate disposed adjacent said grid and an end of said fuel rods and having holes which allow flow of liquid coolant through said end nozzle adapter plate and into said fuel assembly, a trap for capturing and retaining debris carried by said flowing coolant to prevent entry of debris into said fuel assembly, said debris trap comprising:

(a) a structure disposed across said end nozzle and adjacent said adapter plate on an opposite side thereof from said grid and said end of said fuel rods, said structure being composed of a plurality of straps aligned with respect to each other in a crisscross interlocking arrangement and defining wall portions forming a multiplicity of small cells each being open at opposite ends and defining a central channel for passage of coolant flow therethrough to said adapter plate of said end nozzle, said wall portions of each cell being defined in oppositely-disposed interconnected pairs thereof, some of said wall portions being common to two adjacent cells; and (b) means defined in each of said cells for capturing and retaining within said structure debris carried into said cells by said coolant flowing therethrough, said capturing and retaining means in each said cell being in the form of spring-like fingers punched out of respective ones of said wall portions of said cell and bent to extend both vertically and horizontally into said channels of said cell and other cells adjacent thereto, one pair of said fingers on one pair of said wall portions in a cell being disposed downstream from and in overlapping relation with another pair of said fingers on another pair of said wall portions in said cell such that a fuel rod cannot enter said cell, said wall portions which are common to two adjacent cells having a pair of said fingers punched out therefrom being located upstream and downstream from one another and extending oppositely into separate ones of said two adjacent cells.

2. The debris trap as recited in claim 1, wherein said finger has at least one hole defined therethrough.

3. The debris trap as recited in claim 1, wherein said structure has cross-sectional dimensions sized to fit said structure within said end nozzle, and said trap further includes means on said structure for releasably locking it within said end nozzle.

4. The debris trap as recited in claim 3, wherein said locking means is in the form of a pair of leaf springs disposed on opposite sides of said structure and engageable with said end nozzle upon installation of said structure in said end nozzle.

5. The debris trap as recited in claim 1, wherein said structure has a downstream end facing toward said end nozzle adapter and an upstream end facing away from said end nozzle adapter, and said trap further includes a plurality of tabs mounted on said upstream end of said structure and projecting outwardly therefrom for grasping and holding pieces of debris generally stationary so as to prevent lateral circulation thereof along, and repeated impact thereof against, said structure.

6. The debris trap as recited in claim 5, wherein said trap further includes a plurality of projections mounted on said downstream end of said structure and extending toward said end nozzle adapter plate for defining sufficient space between said structure and end nozzle adapter plate to permit cross flow of coolant between said trap and said end nozzle adapter plate.

7. In a liquid cooled nuclear reactor having a plurality of fuel assemblies supported on a lower core plate, each of said fuel assemblies and said lower core plate being constructed to allow coolant flow therethrough, said fuel assembly including a plurality of nuclear fuel rods, a plurality of grids axially disposed along and supporting said fuel rods in an organized array, a bottom nozzle having a central adapter plate disposed adjacent a lowermost one of said grids and a lower end of said fuel rods, said adapter plate having a series of coolant flow holes defined therethrough and a plurality of transversely-displaced legs extending downwardly from the periphery of said adapter plate for supporting said fuel assembly on said lower core plate of said reactor and in alignment with a plurality of coolant flow openings in said lower core plate, and liquid coolant flowing from said openings in said lower core plate and through said holes in said bottom nozzle adapter plate a trap for capturing and retaining debris carried by said flowing coolant to prevent entry of debris into said fuel assembly, said debris trap comprising:

(a) a structure disposed within and across said bottom nozzle transversely between said legs thereof and axially along said legs below said bottom nozzle adapter plate and above said lower core plate in a path of coolant flow from said openings in said core plate and to said holes in said adapter plate;

(b) said structure being composed of a plurality of straps aligned with respect to each other in a crisscross arrangement, said straps defining a plurality of interconnected wall portions which form a multiplicity of cells each being open at opposite ends and defing a central channel extending generally parallel to said path of coolant flow for passage of coolant therethrough to said adapter plate of said bottom nozzle, said wall portions of each cell being defined in oppositely-disposed interconnected pairs thereof, some of said wall portions being common to two adjacent cells; and (c) a plurality of spring-like fingers disposed in each cell and extending into said channel for capturing and retaining within said structure debris carried into said cell by said coolant flowing therethrough, said spring-like fingers being punched out of respective ones of said wall portions of said cell and bent to extend both vertically and horizontally into said channels of said cell and other cells adjacent thereto, one pair of said fingers on one pair of said wall portions in a cell being disposed downstream from and in overlapping relation with another pair of said fingers on another pair of said wall portions in said cell such that a fuel rod cannot enter said cell, said wall portions which are common to adjacent cells having a pair of said fingers punched out therefrom being located upstream and downstream from one another and extending oppositely into separate ones of said two adjacent cells.

8. The debris trap as recited in claim 7, wherein said each finger has at least one hole defined therethrough.

9. The debris trap as recited in claim 7, wherein said each wall portion has an opening formed therein at the region where said finger was punched out, said openings in said wall portions facilitating cross flow of coolant between individual ones of said cells.

10. The debris trap as recited in claim 7, wherein said structure has cross-sectional dimensions sized to fit said structure within said bottom nozzle adjacent said adapter plate and between said legs thereof.

11. The debris trap as recited in claim 10, further comprising means on said structure for releasably locking it within said bottom nozzle.

12. The debris trap as recited in claim 11, wherein said locking means is in the form of a pair of leaf springs disposed on opposite sides of said structure and engagable with at least two of said bottom nozzle legs upon installation of said structure in said bottom nozzle.

13. The debris trap as recited in claim 7, wherein said structure has a downstream end facing toward said bottom nozzle adapter plate and an upstream end facing toward said lower core plate, and said trap further includes a plurality of lower tabs mounted on said upstream end of said structure and projecting outwardly toward said lower core plate for grasping and holding pieces of debris generally stationary so as to prevent lateral circulation thereof along said lower core plate and repeated impact thereof against said structure.

14. The debris trap as recited in claim 7, further comprising a plurality of projections mounted on said downstream end of said structure and extending toward said bottom nozzle adapter plate for defining sufficient space between said structure and bottom nozzle adapter plate to permit cross flow of coolant between said trap and said bottom nozzle.

* * * * *